March 1, 1966 T. S. TE VELDE 3,238,372

OPTO-ELECTRONIC BINARY COUNTER

Filed July 19, 1962

INVENTOR
TIES S. TE VELDE
BY
AGENT

United States Patent Office
3,238,372
Patented Mar. 1, 1966

3,238,372

OPTO-ELECTRONIC BINARY COUNTER

Ties Siebolt te Velde, Eindhoven, Netherlands, assignor to North American Philips Company, Inc., New York, N.Y., a corporation of Delaware Filed July 19, 1962, Ser. No. 211,068
Claims priority, application Netherlands, Aug. 21, 1961, 268,463
2 Claims. (Cl. 250—209)

This invention relates to binary counting circuits, which generally comprise two switching stages connected parallel to a source of supply. It relates in particular to such circuits of the opto-electronic type wherein each stage comprises a series-combination of an electroluminescent element and a photoconductor, the photoconductor of one stage being connected in parallel with the electroluminescent element of the other stage; the photoconductor of each stage is adapted to be irradiated by the electroluminescent element of the same stages, the radiation decreasing the resistance of the photoconductor and thus maintaining the electroluminescent element connected in series with it in the radiating state and bringing the electroluminescent element connected in parallel with it into the non-radiating state.

In such a known binary counting circuit, a radiation pulse is applied to each of the two photoconductive elements in order to change the state of the circuit. However, this may present a problem since a pulse of long duration may maintain the circuit in an unstable intermediate state; such instability would allow the circuit to pass to either stable state after the end of the pulse rather than to the desired opposite stable state.

It is a primary object of the invention to provide a binary counting circuit composed of photoconductors and electroluminescent elements which, upon application of a radiation pulse to effect a change in state, is insensitive to further action by the pulse after the change in state has been initiated.

According to one aspect of the invention, a binary counting circuit including two stages as set forth above also comprises a second pair of switching stages each including an electroluminescent element to which a first photoconductor is connected in parallel and a second photoconductor element which is connected in series with this parallel combination.

In each stage of the second pair, the second photoconductor is irradiated by the electroluminescent element of the same stage, in order to reduce the resistance thereof and maintain the electroluminescent element in the radiating state. The first photoconductor of each stage of the second pair is irradiated by the electroluminescent element of the other stage, in order to decrease the resistance thereof and maintain the electroluminescent element connected in parallel therewith in the non-radiating state. Pulses derived from a source of supply are applied to the second pair of stages and the second photoconductor of one stage of the second pair is irradiated by the electroluminescent element of one stage of the first pair, in order to reduce the resistance thereof and bring the electroluminescent element connected in series with it into the conductive state during the occurrence of a pulse. The photoconductor of the other stage of the first pair is irradiated by the electroluminescent element of the said one stage of the second pair, in order to decrease the resistance thereof and bring the electroluminescent element connected in series with it into the radiating state.

In order that the invention may be readily carried into effect, it will now be described in detail, by way of example, with reference to the accompanying diagrammatic drawing, in which.

Identical circuit elements are indicated in the figures by the same reference numerals.

Figure 1:
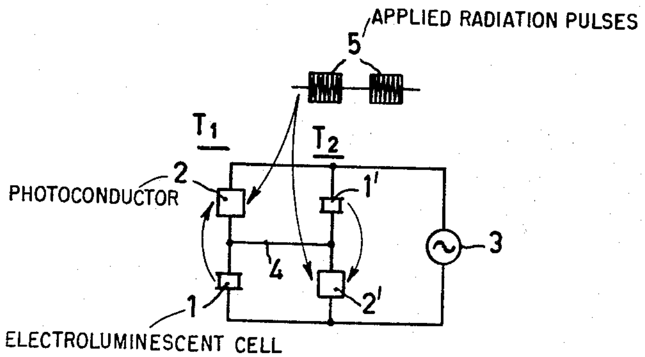
FIG. 1 shows a counting circuit of known type.

The circuit shown in FIG. 1 includes two stages $T_1$ and $T_2$, comprising an electroluminescent element 1, 1' in series with a photoconductor 2, 2', respectively, the series-combinations being connected to a common source of supply 3. By means of a connecting lead 4, together with the supply leads of the source of supply, the electroluminescent element of one stage is connected as shown in parallel with the photoconductor of the other stage. The photoconductor of each stage is adapted to be irradiated by the electroluminescent element of the same stage. Let it be assumed that the electroluminescent element of stage $T_1$ is in the radiating state. The photoconductor 2 of stage $T_1$ is irradiated with an intensity such that its resistance is low. The voltage across the electroluminescent element is then substantially equal to the supply voltage and this is sufficient to maintain the electroluminescent element in the radiating state. An electroluminescent element may irradiate a photoconductor through an optical coupling shown diagrammatically by a line provided with an arrow in the direction of radiation. Such couplings are obtained, for example, by placing the photoconductor opposite a radiating part of the electroluminescent element. The circuit is controlled in known manner by radiation pulses 5 applied simultaneously to the photoconductors of the two stages.

The circuit operates as follows: Assume that the electroluminescent element of stage $T_1$ is in the radiating state. In this state, the photoconductor 2 of stage $T_1$ has a low resistance and constitutes a short-circuit for the electroluminescent element 1' of stage $T_2$, which is in the non-radiating state. The photoconductor 2' of stage $T_2$ has a high resistance since it is not being irradiated. A radiation pulse 5 will cause a decrease in the resistance of the photoconductor 2' of stage $T_2$, resulting in a decrease of the voltage across the electroluminescent element 1 of stage $T_1$ connected parallel thereto. The intensity of the radiation on photoconductor 2 of stage $T_1$ thus decreases. The circuit is physically arranged in known manner so that the decrease in the raidant intensity of the electroluminescent element 1 of stage $T_1$ becomes greater than the intensity of radiation pulse 5 on the photoconductor 2. The total intensity of the radiation of photoconductor 2 of stage $T_1$ then decreases, resulting in an increase of its resistance. Consequently, the electroluminescent element 1' of stage $T_2$ connected parallel therewith is brought into the radiating state. The radiation of said element adds to the decrease in the resistance of the photoconductor connected in series with it, and the process thus becomes regenerative. At a certain moment in the regenerative process a situation occurs in which the radiations of the two electroluminescent elements have the same intensity. If the radiation pulse is maintained the circuit remains in this state. After the end of the pulse, the electroluminescent element of either stage $T_1$ or stage $T_2$ may pass to the radiating state, depending on inherent asymmetries in the circuit. In this circuit, the radiation pulse must therefore be terminated as soon as the regenerative process has set in. The regenerative process is completed with proper operation when the electroluminescent element 1 of stage $T_1$ is in the non-radiating state and the electroluminescent element 1' of statge $T_2$ is in the radiating state.

In accordance with the invention, an unstable intermediate state is prevented by applying the radiation pulses 5 to the stages of the known counting circuit of FIG. 1 through two additional stages. The additional stages are indicated as $T_3$ and $T_4$ in FIG. 2, and comprise respectively an electroluminescent element 6, 6' to which a photoconductor 7, 7′ is connected in parallel and a photoconductcor 8, 8′ which is connected in series with the parallel combination. The series combinations are connected parallel to the series-combination of a source of supply 3 and a photoconductor 9 adapted to be irradiated by radiation pulses 5. The stages $T_3$ and $T_4$ are thus fed by the source 3 during the radiation pulses. The electroluminescent element 6, 6′ of a stage may irradiate the photoconductor 8, 8′ connected in series with it and the photoconductor 7, 7′ of the other stage. When during a radiaion pulse 5 an electroluminescent element 6, 6′ is caused to radiate, it maintains the phtooconductor 8, 8′ at a low resistance such that the electroluminescent element keeps radiating during the pulse. The irradiated photoconductor 7, 7′ during the pulse has a low resistance such that the electroluminescent element connected in parallel with it cannot be caused to radiate.

Figure 2:
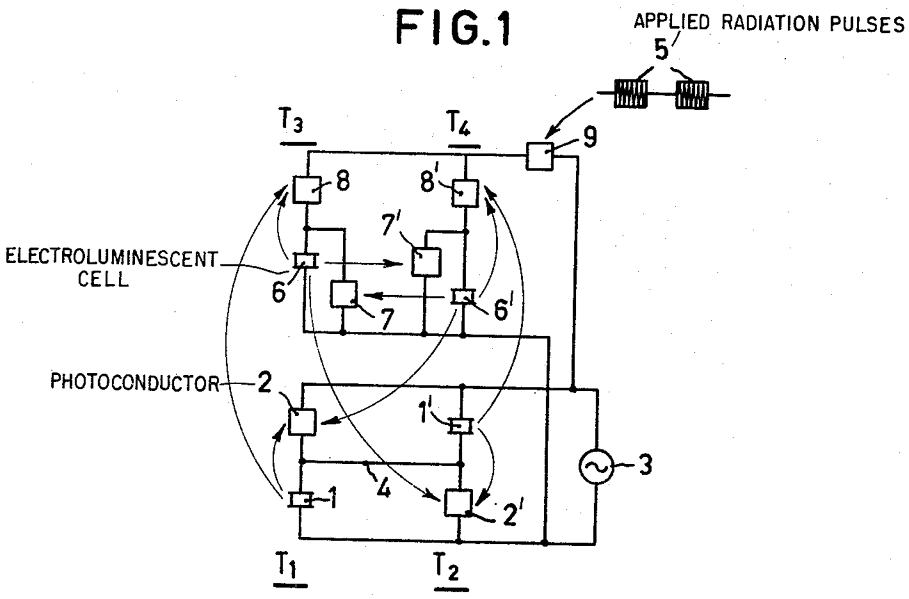
FIG. 2 shows one embodiment of a circuit according to the invention.

The stages $T_1$ and $T_2$ shown in FIG. 2 are identical with those shown in FIG. 1.

The circuit of FIG. 2 operates as follows: Assume that the electroluminescent element 1 of stage $T_1$ is radiating. In this state, the electroluminescent element irradiates the photoconductor 8 of stage $T_3$ and maintains the resistance thereof at a low value. The photoconductor 9 of stage $T_4$ has a high resistance. A radiation pulse 5 causes a decrease in the resistance of photoconductor 9, so that the electroluminescent element 6 of stage $T_3$ is brought into the radiating state and maintained in this state for the duration of the pulse. The electroluminescent element 6 of stage $T_3$ irradiates photoconductor 2 of stage $T_2$ and reduces the resistance thereof to a low value. The intensity of the radiation of the electroluminescent element 1 of stage $T_1$ connected in parallel therewith thus decreases. A regenerative process sets in similar to that described with reference to FIG. 1, except that the photoconductor 2 of stage $T_1$ is irradiated solely by the electroluminescent element 1 connected in series with it. After a short period, the electroluminescent element 1′ of stage $T_2$ is in the radiating state and the electroluminescent element 1 of stage $T_1$ is in the non-radiating state.

The electroluminescent element 6 of stage $T_3$ also irradiates the photoconductor 7′ of stage $T_4$. The photoconductcor 8′ of stage $T_4$ is irradiated by the electroluminescent element 1′ of stage $T_2$. The photoconductor 7′ has so low a resistance that, despite the low resistance of photoconductoor 8′, the electroluminescent element 6′ of stage $T_4$ cannot be brought into the radiating state by radiation pulse. After the end of the raditaion pulse, the electroluminescent element 6 of stage $T_3$ passes to the non-radiating state, so that photoconductor 7′ of stage $T_4$ acquires a high resistance. Photoconductor 8′ of stage $T_4$, however, is maintained at a low resistance value and is ready to pass a subsequent radiation pulse to the electroluminescent element connected in series with it. This radiation pulse brings the electroluminescent element 6′ of stage $T_4$ into the radiating state, whereafter a cycle as above-described takes place with the stages $T_3$, $T_4$ and the stages $T_1$, $T_2$ exchanged.

Due to the inclusion of stages $T_3$, $T_4$ a radiation pulse may be maintained for any arbitrary period since the electroluminescent element in only one of the stages $T_3$ and $T_4$ can be brought into the radiating state.

It should be noted that it is possible for a plurality of counting circuits of the type shown in FIG. 2 to be united into a cascade counting circuit. To this end, a radiation pulse is derived, for example, from an electroluminescent element of one of the stages $T_3$ and $T_4$ and applied to a photoconductor 9 of a succeeding binary counting circuit.

While the invention has been described for a specific embodiment, various modifications thereof will be readily apparent to those skilled in the art without departing from the inventive concept, the scope of which is set forth in the appended claims.

The relative physical dispositions of the photoconductors and the electroluminescent elements will be clear to those skilled in the art from the optical couplings shown in FIG. 2, keeping in mind, for example, that it is possible for a photoconductor irradiated by a plurality of electroluminescent elements to be replaced by a plurality of photoconductors connected in parallel, each irradiated by one electroluminescent element.

What is claimed is:

1. A binary counting circuit comprising: first and second switching stages connected parallel to a source of supply, each including a first photoconductor and a first electroluminescent element connected in series, the first photoconductor of each of said first and second stages being connected in parallel with the first electroluminescent element of the other stage and being irradiated by the first electroluminescent element of the same stage, and third and fourth switching stages each including a second electroluminescent element and a second photoconductor connected in parallel and a third photoconductor connected in series with the parallel combination, the third photoconductor of said third and fourth stages being irradiated by the second electroluminescent element of the same stage and the first electroluminescent element of said first and second stages, respectively, the second photoconductor of one of said third and fourth stages being irradiated by the second electroluminescent element of the other of said stages, the first photoconductor of said first and second stages being irradiated by the second electroluminescent element of said fourth and third stages, respectively, and means for applying pulses to said third and fourth stages.

2. A binary counting circuit comprising: first and second switching stages connected parallel to a source of supply, each including a first photoconductor and a first electroluminescent element connected in series, the first photoconductor of each of said first and second stages being connected in parallel with the first electroluminescent element of the other stage and being irradiated by the first electroluminescent element of the same stage, and third and fourth switching stages each including a second electroluminescent element and a second photoconductor connected in parallel and a third photoconductor connected in series with the parallel combination, the third photoconductor of said third and fourth stages being irradiated by the second electroluminescent element of the same stage and the first electroluminescent element of said first and second stages, respectively, the second photoconductor of one of said third and fourth stages being irradiated by the second electroluminescecnt element of the other of said stages, the first photoconductor of said first and second stages being irradiated by the second electroluminescent element of said fourth and third stages, respectively, an additional photoconductor connected between said source and said third and fourth stages, and pulse means for irradiating said additional photoconductor.

References Cited by the Examiner

UNITED STATES PATENTS

| | | | |
|---|---|---|---|
| 2,947,874 | 8/1960 | Tomlinson | 250—213 X |
| 2,949,538 | 8/1960 | Tomlinson | 250—213 |
| 2,985,763 | 5/1961 | Ress | 250—208 |
| 3,066,223 | 11/1962 | Vize | 250—213 X |
| 3,073,963 | 1/1963 | Marko | 250—213 |
| 3,087,068 | 4/1963 | Bowerman | 250—209 |

OTHER REFERENCES

IBM Technical Disclosure Bulletin, volume 2, No. 2, August 1959.

RALPH G. NILSON, *Primary Examiner.*

MALCOLM A. MORRISON, *Examiner*